United States Patent [19]
Rust

[11] Patent Number: 5,857,035
[45] Date of Patent: Jan. 5, 1999

[54] ARITHMETIC CODING COMPRESSOR FOR ENCODING MULTIPLE BIT VALUES

[75] Inventor: Robert A. Rust, Boise, Id.

[73] Assignee: Hewlett-Packard Company, Palo Alto, Calif.

[21] Appl. No.: 858,722

[22] Filed: May 19, 1997

[51] Int. Cl.[6] .............................. G06K 9/36; G06K 9/46
[52] U.S. Cl. ............................................ 382/247; 382/232
[58] Field of Search ..................... 382/232, 238, 382/239, 243, 244, 247; 348/387, 390, 394, 409; 358/426, 430, 261.2, 539; 364/715.02; 375/246, 250, 253

[56] References Cited

U.S. PATENT DOCUMENTS 5,297,220   3/1994   Nimizu .................................... 382/247

*Primary Examiner*—Leo H. Boudreau
*Assistant Examiner*—Dmitry A. Novik
*Attorney, Agent, or Firm*—Anthony J Baca

[57] ABSTRACT

The present invention looks for large regions of white or black pixels. In those regions, it is very likely the next few pixels will continue to be the same all white/black value. The present invention replaces the actual encoding of those pixels with whether or not the multi-bit jump was a success. If the jump was unsuccessful then each of the bits unsuccessfully jumped over is encoded using a predefined location in the probability table.

13 Claims, 6 Drawing Sheets

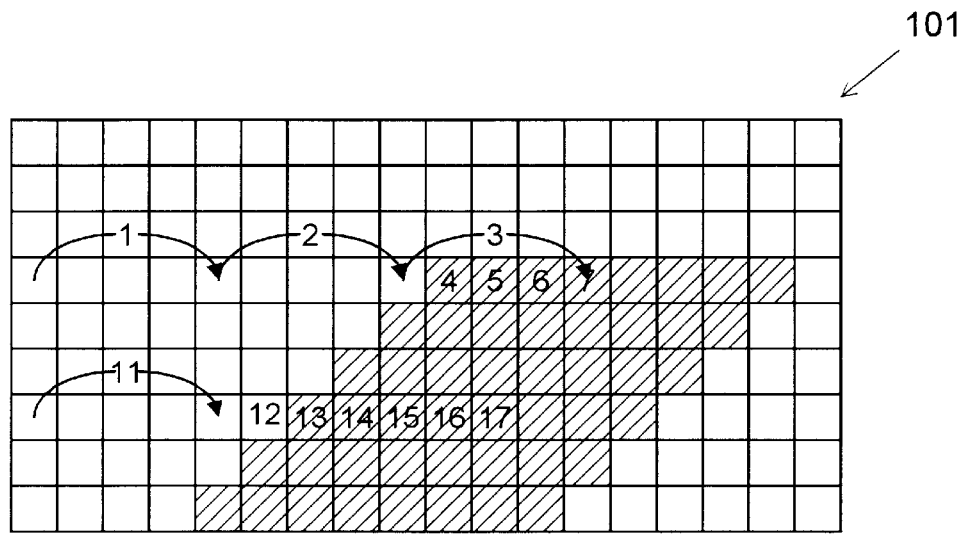
FIG. 1
FIG. 2
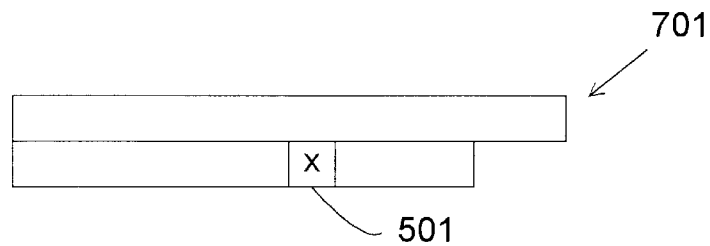
FIG. 3
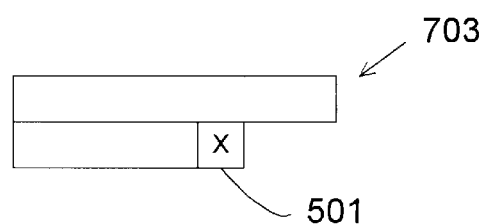
FIG. 4

ARITHMETIC CODING COMPRESSOR FOR ENCODING MULTIPLE BIT VALUES

FIELD OF THE INVENTION

The present invention relates to a method and device for arithmetically encoding an image containing halftones and, more particularly, an arithmetic coder that encodes and decodes multiple bit per value.

BACKGROUND OF THE INVENTION

Data compression systems are known in the prior art that encode a stream of digital data signals into compressed digital code signals and decode the compressed digital code signals back into the original data. Data compression refers to any process that attempts to convert data in a given format into an alternative format requiring less space than the original. The objective of data compression systems is to effect a savings in the amount of storage required to hold or the amount of time required to transmit a given body of digital information.

To be of practical utility, a general purpose digital data compression system should satisfy certain criteria. The system should have reciprocity. In order for a data compression system to possess the property of reciprocity it must be possible to re-expand or decode the compressed data back into its original form without any alteration or loss of information. The decoded and original data must be identical and indistinguishable with respect to each other. The property of reciprocity is synonymous to that of strict noiselessness used in information theory. Some applications do not require strict adherence to the property of reciprocity. One such application in particular is when dealing with graphical data. Because the human eye is not that sensitive to noise, some alteration or loss of information during the compression de-compression process is acceptable.

The system should provide sufficient performance with respect to the data rates provided by and accepted by the devices with which the data compression and de-compression systems are communicating. The rate at which data can be compressed is determined by the input data processing rate into the compression system, typically in millions of bytes per second (megabytes/sec). Sufficient performance is necessary to maintain the data rates achieved in present day disk, tape and communication systems which rates typically exceed one megabyte/sec. Thus, the data compression and decompression system must have enough data bandwidth so as to not adversely affect the overall system. The performance of data compression and decompression systems is typically limited by the computations necessary to compress and de-compress and the speed of the system components such as, random access memory (RAM), and the like, utilized to store statistical data and guide the compression and de-compression process. Performance for a compression device is characterized by the number of processor cycles required per input character under the compressor. The fewer the number of cycles, the higher the performance.

Another important criteria in the design of data compression and de-compression systems is compression effectiveness, which is characterized by the compression ratio. The compression ratio is the ratio of data size in uncompressed form divided by the size in compressed form. In order for data to be compressible, the data must contain redundancy. Compression effectiveness is determined by how effectively the compression procedure uses the redundancy in the input data. In typical computer stored data, redundancy occurs both in the nonuniform usage of individual symbology, example digits, bytes, or characters, and in frequent recurrence of symbol sequences, such as common words, blank record fields and the like.

General purpose data compression procedures are also known in the prior art, three relevant procedures being the Huffman method, the Tunstall method and the Lempel-Ziv method. The Huffman method is widely known and used, reference thereto in article of D. A. Huffman entitled "A Method For Construction Of Minimum Redundancy Codes", Proceedings IRE, 40, 10 pages 1098–1100 (September 1952). Reference to the Tunstall algorithm may be found in Doctoral thesis of B. P. Tunstall entitled "Synthesis of Noiseless Compression Codes", Georgia Institute of Technology (September 1967). Reference may be had to the Lempel-Ziv procedure in a paper authored by J. Ziv and A. Lempel entitled "A Universal Algorithm For Sequential Data Compression", IEEE Transactions on Information Theory, IT-23, 3, pages 337–343 (May, 1977).

One of the first general purpose data compression procedures developed is the Huffman method. Briefly described, the Huffman procedure maps full length segments of symbols into variable length words. The Huffman data compression procedure suffers from two limitations. Firstly, the Huffman procedure operates under the constraint that the input data to be compressed be parsed into fixed length segments of symbols. Although the Huffman procedure provides the best compression ratio that can be obtained under these constraints, when the constraint is relaxed it is possible to obtain significantly better compression ratios by utilizing other procedures. Secondly, Huffman coding requires full knowledge of the statistical characteristic of the source data. The Huffman procedure operates under the assumption that the probability with which each fixed length input segment occurs is known. This requirement of the Huffman procedure can in practice, be satisfied by the use of an adaptive version of the procedure which accumulates the necessary statistics during processing of the data. This, however, is cumbersome, and requires considerable working memory space and performs sub-optimally during adaptation.

The Tunstall algorithm, which maps variable length segments of symbols into fixed length binary words, is complimentary to the Huffman procedure with the fixed length constraints now applied to the output segments instead of the input segments. Like the Huffman procedure, the Tunstall procedure requires a foreknowledge of the source data probabilities. Again this foreknowledge requirement can be satisfied to some degree by utilizing an adaptive version which accumulates the statistics during processing of the data.

The Lempel-Ziv procedure maps variable length segments of the symbols into variable length binary words. It is asymptotically optimal when there are no constraints on the input or output segments. In this procedure the input data string is parsed into adaptively grown segments, each segment consisting of an exact copy of an earlier portion of the input string suffixed by one new symbol from the input data. The copy which is to be made is the longest possible and is not constrained to coincide with any earlier parsed segment. The code word which replaces the segment in the output contains information consisting of a pointer to where the earlier copied portion begins, the length of the copy, and the new symbol.

It would appear that Huffman or Shannon-Fano coding is the perfect means of compressing data. However, this is not the case. As mentioned above, these coding methods are optimal when and only when the symbol probabilities are integral powers of ½, which is usually not the case.

The technique of arithmetic coding does not have this restriction: It achieves the same effect as treating the message as one single unit (a technique which would, for Huffman coding, require enumeration of every single possible message), and thus attains the theoretical entropy bound to compression efficiency for any source.

In arithmetic coding, one decision after another is encoded to define successfully smaller, lesser included intervals along a number line. Additional information on arithmetic coding can be found in "An Introduction To Arithmetic Encoding"; by G. G. Langdon, Jr., IBM Journal of Research and Development, Vol. 28, n. 2, March 1984, 135–149; and "Arithmetic Compression Code Control Parameters Approximation"; by D. R. Helman, G. G. Langdon, Jr., and J. J. Rissanen, Vol. 23, n. 11, April 1981, 5112–5114 and U.S. Pat. No. 4,905,297, "Arithmetic Coding Encoder And Decoder System", Langdon, Jr. et al. all incorporated herein by reference.

As noted in the above articles, arithmetic coding provides that each decision has a plurality of possible exclusive outcomes "or events". Each outcome or event is represented in data by a symbol. In the imaging environment, for example, each decision may correspond to whether or not a given pixel is black. The decision outcome being represented by a Y (or YES) symbol if the pixel is black or an N (or NO) symbol if the pixel is not black. Thus, a plurality of decisions may then be represented by a sequence of symbols, e.g., YNNY . . . .

In accordance with prior arithmetic coding teachings, a probability line has a current interval defined thereon. The first current interval is 0 to 1. The current interval is divided into segments in which segment corresponds to one possible outcome for the next decision. Where there are only two possible outcomes for each decision, the current interval is divided into two segments. The length of each segment is based on its respective associated probability. The respective probabilities may remain fixed or may adapt as decision data is entered.

It is the correlating of large segments to symbols which occur with greater frequency that leads to the compression effect. In the former cited article ("An Introduction To Arithmetic Encoding"), a 4-symbol arithmetic coding example is set forth in which each decision can result in an "a" event (having a 50% probability), a "b" event (having a 25% probability), a "c" event (having a 12.5% probability), or a "d" event (having a 12.5% probability). Representing the four events in binary form would require two bits for each decision, where the events would be represented respectively by 00, 01, 10, 11. For three decisions such as "aab" which is highly likely, the straight forward encoding data would be 00 00 01; requiring six bits. However, as observed in the article at page 137, the arithmetic coding approach permits the sequence "aab" to be represented by the value 0.001. Instead of six bits, the information can be represented in three bits. This conservation of bits results as successive events having relatively high associated probabilities occur.

The conservation deteriorates if numerous events occur for which there are low probabilities and relatively short line segments. With the above noted probabilities, a sequence of events "dd" would be represented with encoded data as 11 11 whereas, by arithmetic coding, the "dd" events would be represented by 111111. Provided that the larger segments in fact correspond to events that occur with correspondingly greater frequency, the additional bits needed for less probable symbols are outweighed by the conservation achieved when more probable symbols occur.

When looking for the best lossless compression ratios, arithmetic coding is the state of the art, especially when considering adaptive algorithms. When the arithmetic coder is given a good context model, the compression ratios improve from 200% to 300% over other available LZ based techniques. Additionally, in many cases where the data is nearly random (multi-bit data/photographs), arithmetic coding can obtain a 20% compression when LZ would expand the image.

Memory has become a problem for many systems. In particular, in a laser printer system, 4 MB of RAM is now required to allow the printer to handle 600 DPI data at 12 ppm. The next generation products will have 32 ppm engines with 600 DPI data at 2 bits/pixel. The amount of data has more than doubled, but the memory constraint of 4 MB is constant. The reason the data has more than doubled is due to the page pipe architecture needed to keep several pages in the printer at once. While the current page is very nearly through the printer, the next page begins to move. Descriptions of both pages are needed to keep the printer streaming and still allow for recovery from paper jams or other errors.

Perhaps one of the most serious drawbacks of arithmetic coding is the data throughput performance. Some significantly complicated logic is required to sustain just one bit/cycle performance. This has created a dilemma for the imaging systems because the following constraints have diverged:

Lossless Compression Required for Fidelity in Most Areas

Algorithm Must Adapt to Many Forms of Data

High Compression Ratios—More Data in Systems, Cost Pressure

Higher Data Throughput/Data Needed Real Time

It is presently possible, but difficult to produce arithmetic coding hardware capable of operating at a 66 MHz rate. This yields between 6.0 MB/s to 7.5 MB/s data rates when using the standard one bit at a time approach. The next generation printers need data at a rate of 5.5 MB/s. Real time constraints and the overhead associated with controlling the hardware compressor indicate that the single bit context model is not acceptable. A minimum of 9 MB/s is required to allow for this overhead.

SUMMARY OF THE INVENTION

In order to accomplish the present invention there is a method for compressing and decompressing image data. The compression method first checks if a first context window is homogenous. If the first context window is homogenous, then the compression method attempts to jump over a plurality of bits of the image data. The result of the jump is arithmetically encoded. If the jump was unsuccessful then the compression method arithmetically encodes each of the plurality of bits unsuccessfully jumped over. The compression method then shifts data in the first context window by a number of the plurality of bits. If the first context window is non-homogenous, then the compression method uses a second context window to arithmetically encoding a bit of the image data. Then the compression method shifts data in the first context window by one.

The decompression first checks if a first context window is homogenous. If the first context window is homogenous, then the decompression method arithmetically decodes if a jump over a plurality of bits of the image was successful. If the jump was unsuccessful then decompression method arithmetically decodes each of the plurality of bits. If the jump was successful then the decompression method- replicates a bit with a value equal to the first context window into the plurality of bits. Next, the decompression method shifts data in the first context window by a number the plurality of bits. If the first context window is non-homogenous, then the decompression method uses a second context window to arithmetically decodes a bit of the image data and shifts data in the first context window by one.

BRIEF DESCRIPTION OF THE DRAWINGS

A better understanding of the invention may be had from the consideration of the following detailed description taken in conjunction with the accompanying drawings in which:

FIG. 1 graphically shows the normal context model.

FIG. 2 shows a magnified portions of a diagonal line created with a single bit per pixel data.

FIG. 3 is a graphical representation of an expanded context model window.

FIG. 4 is a graphical representation of the normal context model window.

DETAILED DESCRIPTION OF THE PREFERRED EMBODIMENT

Figure 5:
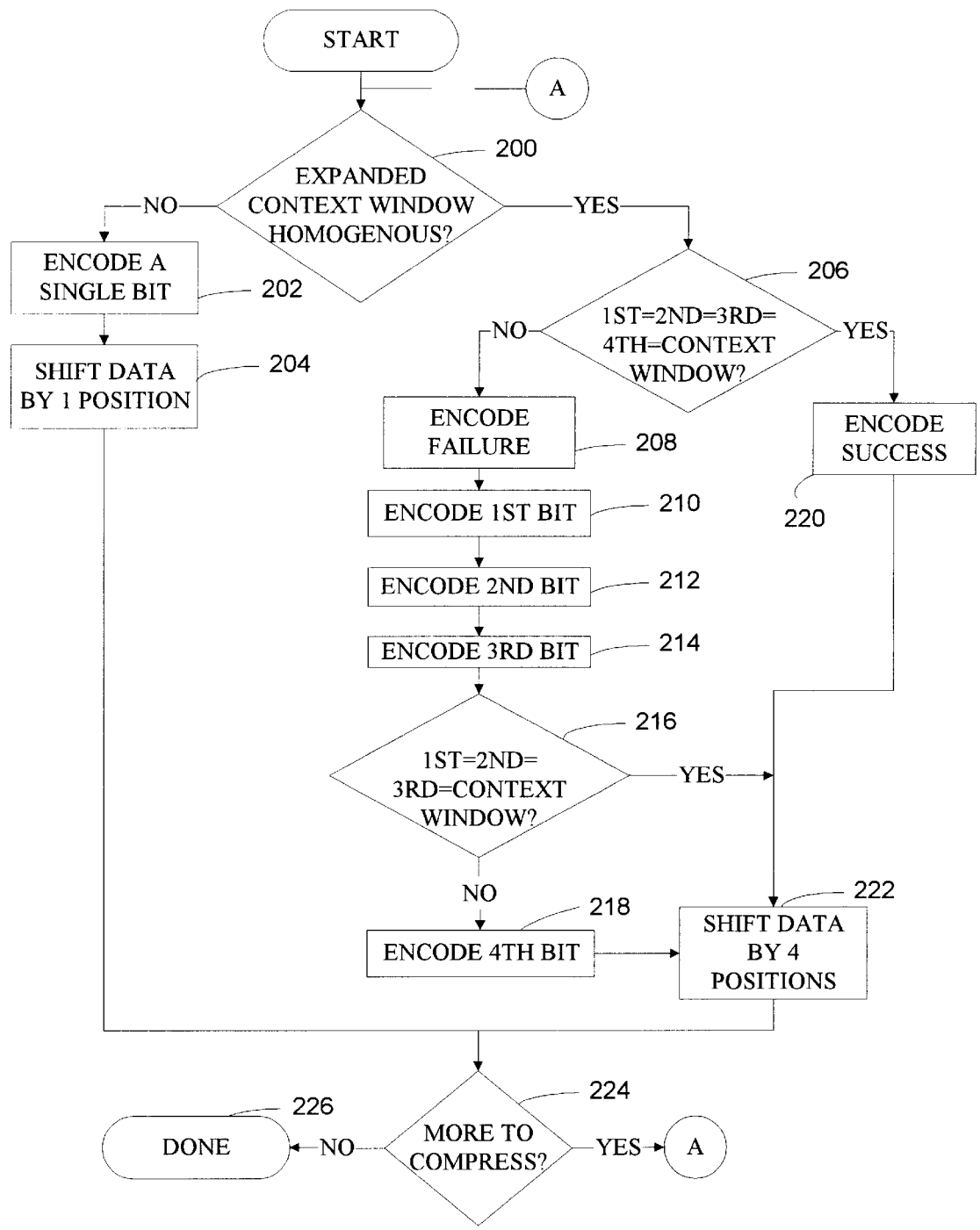
FIG. 5 is a flow diagram showing the logical flow of the compression process of the preferred embodiment.

The present invention is not limited to a specific embodiment illustrated herein. Context models for arithmetic code compressors develop their index into a probability table by looking at bits of data surrounding the bit being compressed. The important aspect to the indexing is the addressed location contains useful information concerning the value of the bit to be encoded/decoded. More specifically, the bits used to index the probability table should be able to provide significant information so that a reliable prediction of the bit to be encoded/decoded can be made. The more reliable the prediction, the better the compressibility of the image. In text and line art images, the bits close (4, 5, 3 and 2 of 1) to the bit 1001 to be encoded/decoded provide the most useful information regarding the value of that bit. Thus, for a text or line art image the context model of FIG. 1 will generally produce the highest data compression.

In FIG. 2, the data 101 represents the top of a diagonal line created with single bit/pixel data, otherwise known as bi-level data. The diagram assumes that a compressor looks at the data in a top-down, left to right fashion. The present invention looks for large regions of white or black pixels. In those regions, it is very likely the next few pixels will continue to be the same all white/black value. The present invention replaces the actual encoding of those pixels with whether or not the multi-bit jump was a success. In FIG. 2 jumps "1", "2", and "3" are all taken. The first two jumps (1 and 2) are encoded as a success while the 3rd jump is a failure. When a jump fails, those pixels which were supposed to be jumped over must be encoded.

Jump failures are handled in a special way with the context model. This is critical for the sake of the compression ratio. Because a jump failure is a surprise, the compressor must output some data to indicate a surprise has occurred. When encoding bits 4 through 7, it is important to take advantage of the knowledge that a surprise has occurred, otherwise, when the coder encodes the 4th pixel, it is likely to be surprised again. Therefore, rather than using the traditional context model for encoding pixels after a failed jump, a new method is used. This method uses a unique context model for each individual pixel position. Thus, the first pixel in the jump (4) has its own context, the second has its own as well, etc. In addition to this, the last pixel in the jump is handled with an incremental level of complexity—but the complexity is necessary to maintain the compression ratio. If the first, second, and third pixels in the jump turn out to be exactly what was expected—white in our example—then there is no need to encode the fourth pixel— it must be black. Otherwise the jump would have been successful.

Now, looking at the row in FIG. 2 where jump 11 is taken. It appears that jump 11 will not be hindered by the approaching black line. However, when looking at the situation on the 13th pixel, it appears the next jump would be risking a failed jump. Remember that the compressor, through the context window of FIG. 3, has the ability to look at the rows of data above the current row. The previous rows give some information about the current row. The compressor reverts to the traditional model using the context window of FIG. 4 to encode bits 12 through 17.

With that high level description, a more detail description of the flowcharts showing the preferred embodiment will be given. Referring now to FIG. 5. First, the expanded context window 701 of FIG. 3 is used to determine if a jump should be attempted 200. If the entire extended context window is not all one color, then a jump is not attempted and the next bit is encoded 202 using the normal context window of FIG. 1. After encoding the next bit, the data in the context window is shifted by one bit position 204. If there is more data to compress 224, execution continues back at 200.

Figure 6:
FIG. 6 graphically shows the pre-defined context model used to encode the success of a jump.

If the extended context window 701 is homogenous, then a jump is attempted 206. If the first, second, third, and fourth bits are equal to the context window, then a successful jump is encoded 220. If the bits jumped over are not all the same as the context window, then a jump failure is encoded 208. In the preferred embodiment, the success or failure encoding of a jump uses a predefined location of 02CAH in the probability table. While any location maybe chosen, to maintain a high compression ratio, the location should ideally be indexed only during a jump encoding. As a compromise to providing a dedicated location, the 02CAH location was chosen because of the low occurrence rate of the bit pattern of FIG. 6 in normal data. The pattern of FIG. 6 represents the bit pattern necessary in the data to access the success/failure location in the probability table.

Figure 7A:
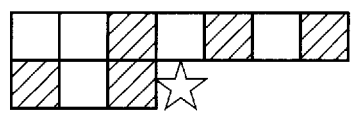
FIG. 7A graphically shows the pre-defined context model used to encode the first bit in a failed jump.
Figure 7B:
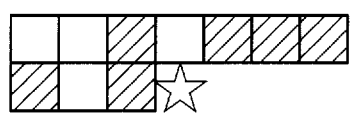
FIG. 7B graphically shows the pre-defined context model used to encode the second bit in a failed jump.
Figure 7C:
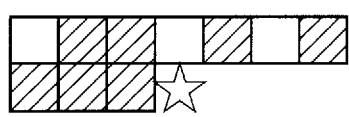
FIG. 7C graphically shows the pre-defined context model used to encode the third bit in a failed jump.
Figure 7D:
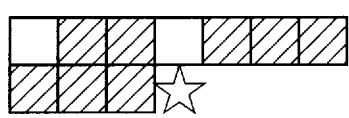
FIG. 7D graphically shows the pre-defined context model used to encode the fourth bit in a failed jump.

As stated above, the encoding of the jumped over bits during a failed jump require special handling. As with the encoding of the success/failure of a jump, in the preferred embodiment, a unique, pre-determined context window is used to encode the bits jumped over. Specifically, the first bit is encoded using a context window of FIG. 7A 210. By using the context window of FIG. 7A a specific address in the probability table, 0135H in the preferred embodiment, is used to encode the probability of each first bit jumped over. Similarly, the second and third bits are encoded 212, 214 each using the own context window FIGS. 7B and 7C, which generate addresses 0137H and 01F5H respectively. Next, if (216) the three bits just encoded are all the same as the context window then bit four must have caused the failure; therefore, it does not need to be encoded and can be skipped over. However, if the three proceeding bits are not all the same as the context window, then the fourth bit must be encoded 218. Encoding the fourth bit uses the context window of FIG. 7D. Finally, because four bits have been encoded, the data in the context window is shifted by four 222. If there is more data to compress 224, execution continues back at 200 until all the bits are compressed 226.

While the above description checks an expanded context window, such a requirement is not necessary. The normal context window may be used with only a minor reduction in the compression ratio.

Figure 8:
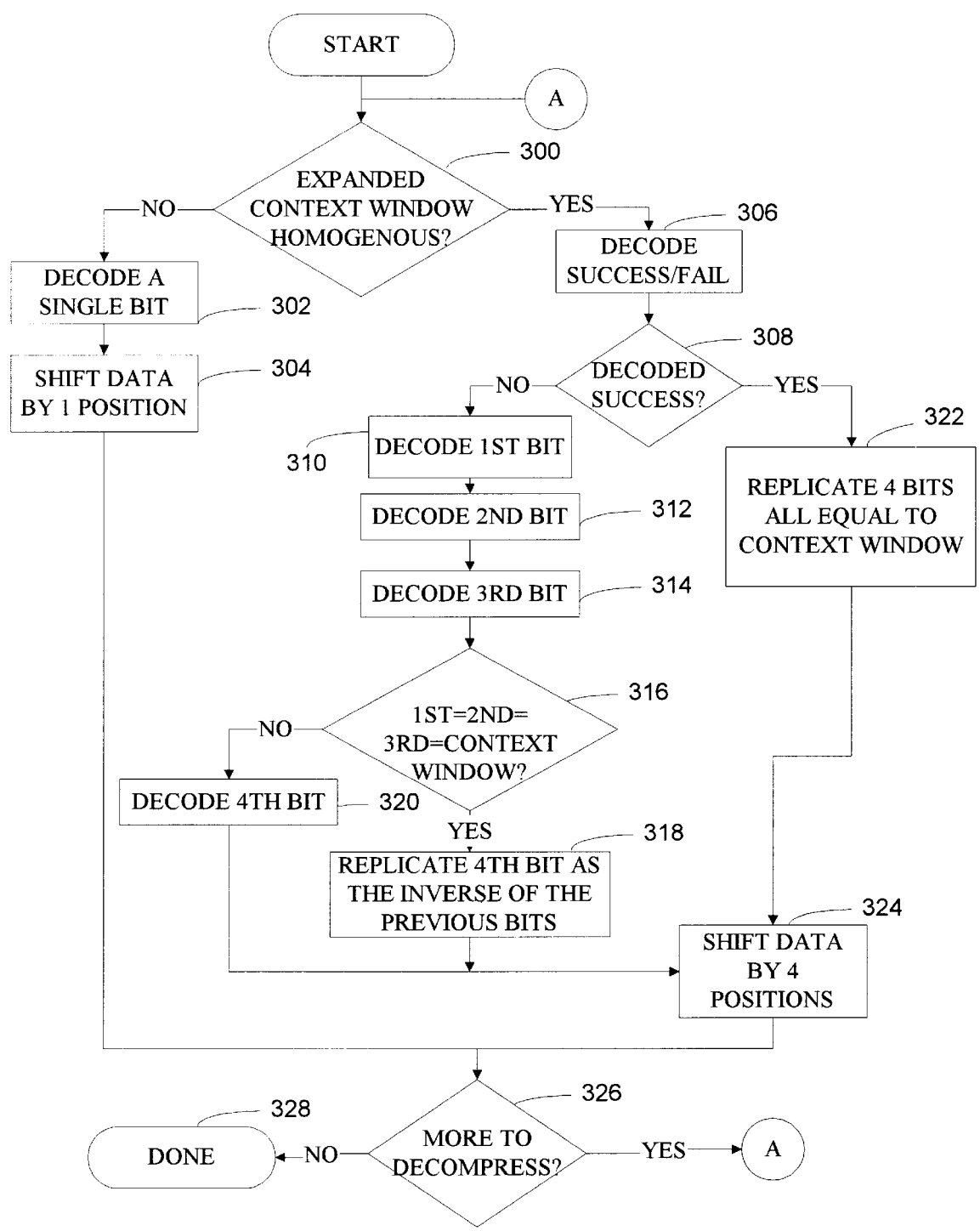
FIG. 8 is a flow diagram showing the logical flow of the decompression process of the preferred embodiment.

Referring now to FIG. 8, the decompression process will now be described. As with the compression description above, first, the expanded context window 701 of FIG. 3 is used to determine if a jump was attempted 300. If the entire extended context window is not all one color, then a jump is was not attempted and the next bit is decoded 302 using the normal context window of FIG. 1. After decoding the next bit, the data in the context window is shifted by one bit position 304. If there is more data to decompress 326, the execution continues back at 300. If the extended context window is homogenous, then a jump was attempted and the outcome of that jump is decoded 306. If the decoding indicates that the jump was successful 308, then the value of the context window is replicated into the four bits jumped over. If the decoding indicates that the jump was unsuccessful 308, the first 310, second 312, and third 314 bits are decoded. As with the compression process, decoding of the jumped over bits during a failed jump require special handling. The same special pre-determined context window is used to decode these bits. Specifically, the first bit is decoded using the context window of FIG. 7A 310. Similarly, the second and third bits are decoded 312, 314 each using their own context window FIGS. 7B and 7C. Next, if (316) the three bits just decoded are all the same as the context window then bit four must have caused the failure; therefore, it does not need to be decoded 318. However, if the three proceeding bits are not all the same as the context window, then the fourth bit must be decoded 320. Decoding the fourth bit uses the context window of FIG. 7D. Finally, because four bits have been decoded, the data in the context window is shifted by four 322. If there is more data to compress 326, execution continues back at 300 until all the bits are compressed 328.

The preferred embodiment implements the process in hardware to provide the high throughput necessary for some applications. A high level diagram of the hardware implementation is given in FIGS. 9 and 10. These figures do not show the internal operations of the encoder 750 or decoder 850 because such operation is known in the art. One skilled in the art of arithmetic data compression will understand how to implement these functions. Additionally, the details of the implementation of MULTIBIT CONTROL 708 are not given, however, one skilled in the art of digital electronics will be able to implement the MULTIBIT CONTROL 708 functions using well known state machine design techniques.

Figure 9:
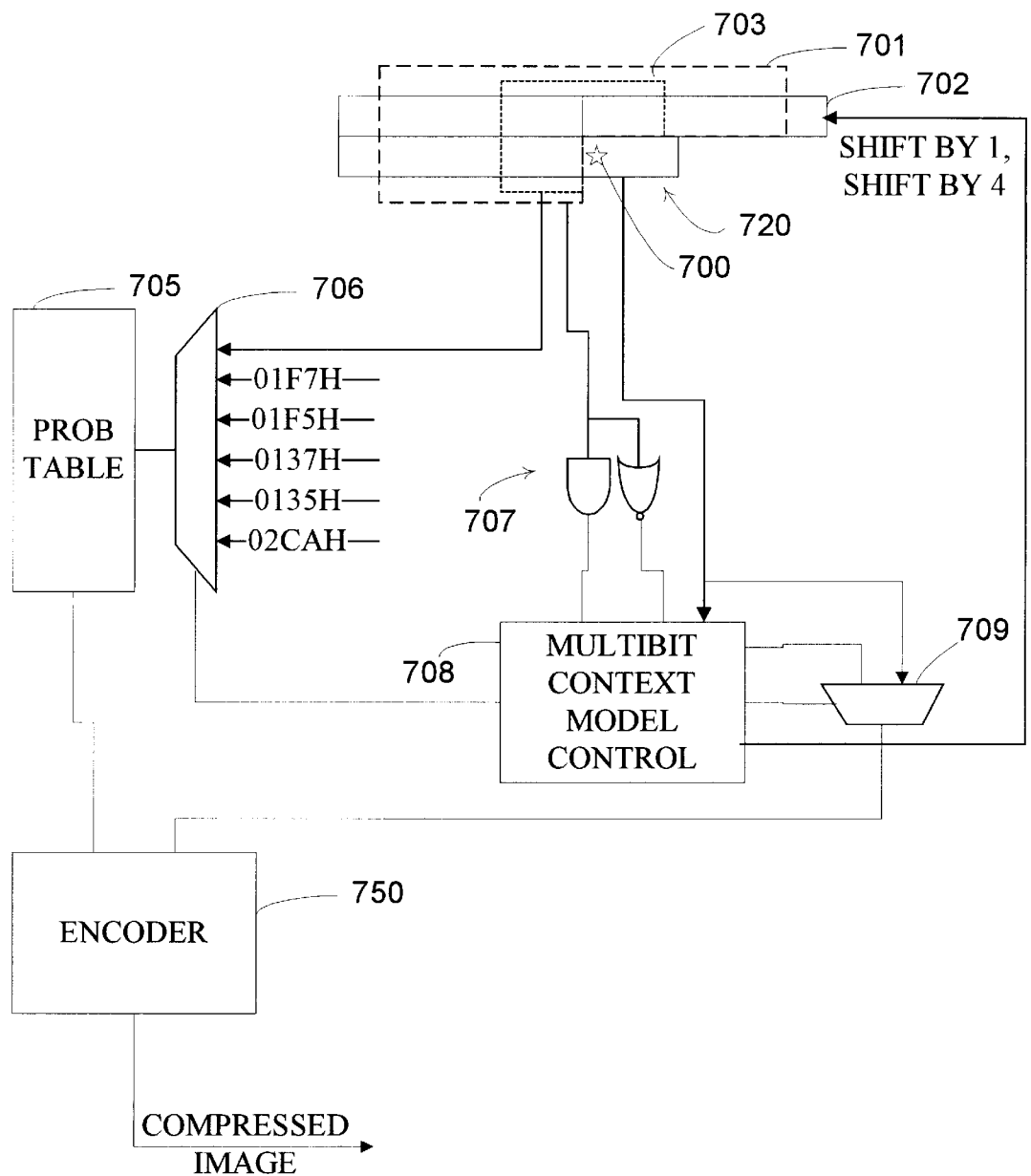
FIG. 9 is a high-level block diagram showing the compression operation.

Referring specifically to FIG. 9, the hardware operation during the compression process will now be described. As uncompressed data is shifted into shift register 702 a new bit 700 is ready to be compressed. First, the extended context window 701 is tested by gates 707 to determine if it is homogenous. If the extended context window 701 is not homogenous, then the MULTIBIT CONTROL 708 configures MUX 709 to output bit 700 and simultaneously configures MUX 706 to output the normal context window 703. After the ENCODER 750 encodes the bit, MULTIBIT CONTROL 708 instructs shift register 701 to shift by one bit position. Compressed data from Encoder 750 may be stored in memory or passed on for further processing.

Assuming that the extended context window is homogenous, then a jump is attempted. A successful jump is detected by looking at the four bits in section 720 of the shift register. If all four bits are the same as the homogenous context window, then a successful jump is encoded. Alternatively, if the four bits are not all the same, then an unsuccessful jump must be encoded. To encode the outcome of the jump MULTIBIT CONTROL 708 configures MUX 709 to output the outcome of the jump and simultaneously configures MUX 706 to output the success/fail location (02CAH) to the probability table 705. If the jump was successful, then shift register 701 is shifted by four.

If the jump was unsuccessful, then the four bits jumped over must be encoded. As described above in FIG. 5, each bit is encoded using a predefined location in the probability table 705. First, MULTIBIT CONTROL 708 configures MUX 709 to output the first bit 700 of 720 and simultaneously configures MUX 706 to output the first fail location (0135H) to the probability table 705. After Encoder 750 encodes the bit, MULTIBIT CONTROL 708 configures MUX 709 to output the second bit of 720 and simultaneously configures MUX 706 to output the second fail location (0137H) to the probability table 705. To encode the third bit, MULTIBIT CONTROL 708 configures MUX 709 to output the third bit of 720 and simultaneously configures MUX 706 to output the third fail location (01F5H) to the probability table 705. Finally, if the first, second and third bits are all the same as the homogenous context window, then the fourth bit caused the jump failure and therefore is not encoded. However, if the three previous bits were not all the same then the fourth bit must be encoded. As with the previous bits, the fourth bit is encoded by configuring MUX 709 to output the fourth bit of 720 and MUX 706 to output the fourth fail location (01F7H) to the probability table 705. After Encoder 750 finishes encoding, MULTIBIT CONTROL 708 causes shift register 702 to shift by four.

Figure 10:
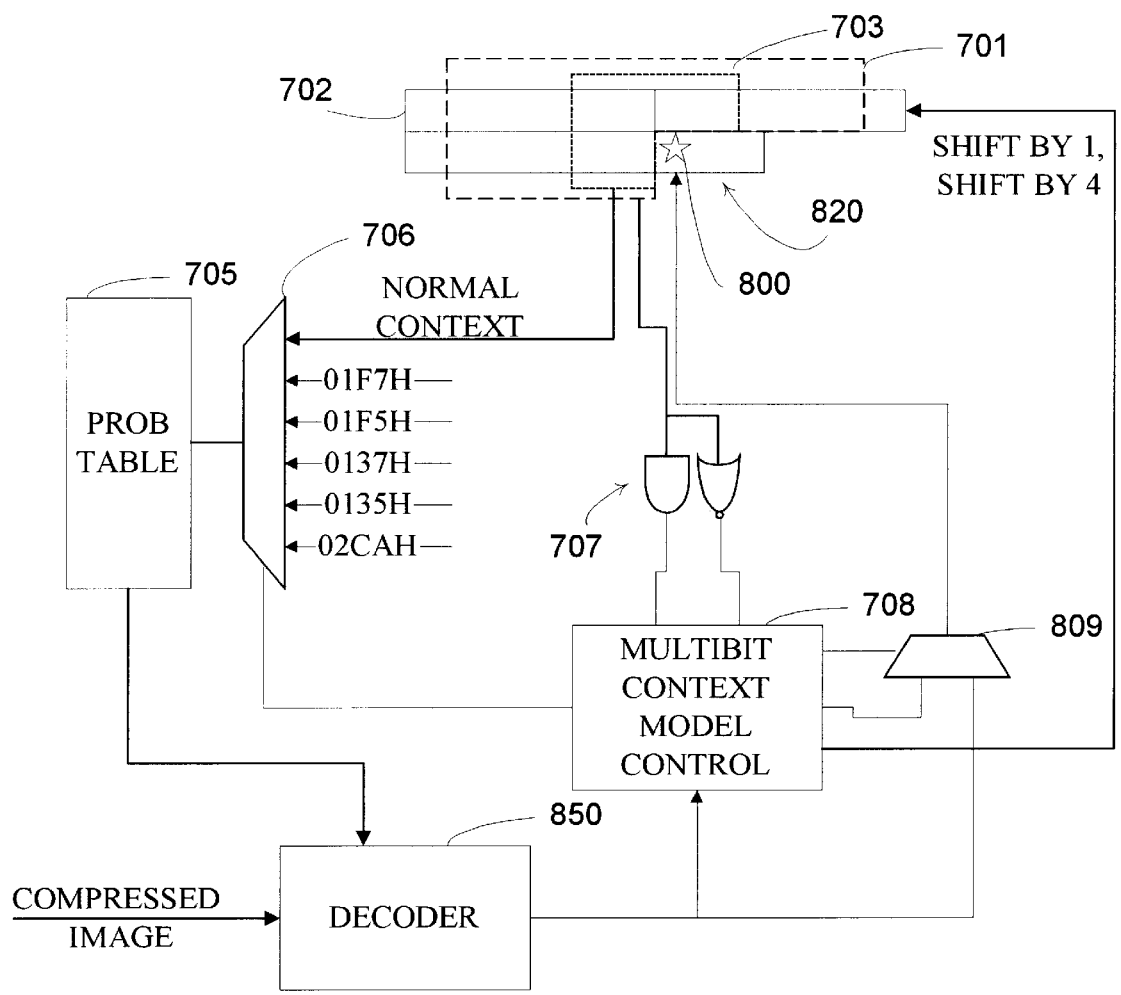
FIG. 10 is a high-level block diagram showing the decompression operation.

Referring now to FIG. 10, the hardware operation during the decompression process will be described. First, the extended context window 701 is tested by gates 707 to determine if it is homogenous. If the extended context window 701 is not homogenous, then the MULTIBIT CONTROL 708 configures MUX 706 to output the normal context window 703 and simultaneously configures MUX 809 to output the decoded bit from Decoder 850. After Decoder 850 decodes the bit and writes it to 800, MULTIBIT CONTROL 708 instructs shift register 701 to shift by one bit position. Decompressed data shifted out of shift register 702 may be stored in memory or passed on for further processing.

Assuming that the extended context window 701 is homogenous, then a jump was attempted during the encoding process. The outcome of the jump is decoded by having the MULTIBIT CONTROL 708 configure MUX 706 to output the success/fail location (02CAH) to the probability table 705. MULTIBIT CONTROL 708 detects the output of Decoder 850 to determine whether the jump was successful. If the jump was successful, then the expected bit is replicated four times into section 820 and shift register 701 is shifted by four. If the jump was unsuccessful, then the four bits jumped over must be decoded. As described above, each bit is decoded using a predefined location in the probability table 705. First, MULTIBIT CONTROL 708 configures MUX 706 to output the first fail location (0135H) to the probability table 705 and simultaneously configures MUX 809 to pass the output of Decoder 850 onto the first bit (800) of 820. After Decoder 850 decodes the bit, MULTIBIT CONTROL 708 configures MUX 706 to output the second fail location (0137H) to the probability table 705 and simultaneously configures MUX 809 to pass the output of Decoder 850 onto the second bit of 820. To decode the third bit, MULTIBIT CONTROL 708 configures MUX 809 to pass the output of Decoder 850 onto the third bit of 820 and simultaneously configures MUX 706 to output the third fail location (01F5H) to the probability table 705. Finally, if the first, second and third bits are all the same as the homogenous context window, then the fourth bit caused the jump failure and therefore is not decoded. However, if the three previous bits were not all the same then the fourth bit must be decoded. As with the previous bits, the fourth bit is decoded by configuring MUX 809 to pass the output of Decoder 850 onto the fourth bit of 820 and MUX 706 to output the fourth fail location (01F7H) to the probability table 705. After Decoder 850 finishes decoding, the MULTIBIT CONTROL 708 causes shift register 702 to shift by four.

The result of this invention is improved performance with compression ratios which very nearly match the previous context windows. The degradation has been measured to be less than 2% expansion of the compressed image. The data rate improvement depends on the type of data compressed. For the most part, the performance is usually in the 15 MB/s range with fairly intensive images. This basically doubles the bandwidth of the compressor over traditional context windows.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for compressing an image data, said method comprising the steps of:
    checking if a first context window is homogenous;
    if said first context window is homogenous, then:
        attempting to jump over a plurality of bits of said image data;
        first arithmetic encoding whether said jump was successful or failed;
        if said jump was unsuccessful then second arithmetic encoding each of said plurality of bits;
        first shifting data in said first context window by a number said plurality of bits;
    if said first context window is non-homogenous, then:
        third arithmetic encoding a bit of said image data; and
        second shifting data in said first context window by one.

2. The method of claim 1 wherein said step of first arithmetic encoding further comprising the step of:
    defining a location in a probability table for use by an arithmetic encoder to store encoding information relating to said jump.

3. The method of claim 1 wherein said step of second arithmetic encoding further comprising the steps of:
    defining a separate location for each bit in said plurality of bits in a probability table; and
    using said separate location for each bit to arithmetically encode each bit.

4. The method of claim 1 wherein said step of third arithmetic encoding further comprising the step of:
    using a second context window to determine a location in a probability table for use by an arithmetic encoder to store encoding information relating to said bit.

5. The method of claim 1 wherein:
    said step of first arithmetic encoding a successful jump if all of said plurality of bits jumped over are equal to said first context window; and
    said step of first arithmetic encoding an unsuccessful jump if any of said plurality of bits jumped over is different than said first context window.

6. The method of claim 3 wherein said plurality of bits including a last bit:
    skipping said step of second arithmetic encoding of said last bit if all bits of said plurality previous to said last bit are equal to said first context window.

7. A method for decompressing an image data, said method comprising the steps of:
    checking if a first context window is homogenous;
    if said first context window is homogenous, then:
        first arithmetic decoding if a jump over a plurality of bits of said image was successful;
        if said jump was unsuccessful then second arithmetic decoding each of said plurality of bits;
        if said jump was successful then replicating a bit with a value equal to said first context window into said plurality of bits;
        first shifting data in said first context window by a number said plurality of bits;
    if said first context window is non-homogenous, then:
        third arithmetic decoding a bit of said image data; and
        second shifting data in said first context window by one.

8. The method of claim 7 wherein said step of first arithmetic decoding further comprising the step of:
    defining a location in a probability table for use by an arithmetic decoder to retrieve decoding information relating to said jump.

9. The method of claim 7 wherein said step of second arithmetic decoding further comprising the steps of:
    defining a separate location for each bit in said plurality of bits in a probability table; and
    using said separate location for each bit to arithmetically decode each bit.

10. The method of claim 7 wherein said step of third arithmetic decoding further comprising the step of:
    using a second context window to determine a location in a probability table for use by an arithmetic decoder to retrieve decoding information relating to said bit.

11. The method of claim 9 wherein said plurality of bits including a last bit:
    decoding said last bit with a value opposite of said first context window if all bits of said plurality previous to said last bit are equal to said first context window.

12. An apparatus for compressing data, said apparatus comprising:

a shift register, said data being shifted into said shift register;

a first context window over said shift register;

a second context window over said shift register;

a probability table connected to said first context window and said second context window;

an arithmetic encoder connected to said probability table; and a controller means connected to said encoder, said probability table, said first context window and said shift register, if said first context window is homogenous said controller means detects if a jump over a plurality of bits is successful and sends to said probability table a jump location, said controller means then instructs said arithmetic encoder to encode whether said jump was successful or failed if said jump is unsuccessful, then said controller means for each bit in said plurality of bits sends to said probability table a bit location and sends each bit to said arithmetic encoder, said controller means shifts said shift register by a number of said plurality of bits if said first context window is non-homogenous then said controller means enabling said probability table to use said second context window and sending a single bit to said arithmetic encoder said controller means shifts said shift register by one.

13. The apparatus as claimed in claim 12 wherein said controller means comprising:

a first multiplexer with an output connected to said probability table and arranged to receive said second context model, said jump location, and a plurality of said bit location;

a second multiplexer with an output connected to said encoder and arranged to receive said single bit, an indicator to whether said jump was successful or failed and said each bit in said plurality of bits;

a detector connected to said first context window, said detector detects if said first context model is homogenous; and a state machine connected to said first multiplexer, said second multiplexer, said detector and said shift register, said state machine configuring said first multiplexer and said second multiplexer in response to said detector.

* * * * *